United States Patent [19]

Suh et al.

[11] Patent Number: 4,636,527

[45] Date of Patent: Jan. 13, 1987

[54] METHOD FOR THE PREPARATION OF STYRENE POLYMER FOAM AND FOAM PREPARED THEREBY

[75] Inventors: Kyung W. Suh, Granville; John M. Kennedy, Wheelersburg, both of Ohio

[73] Assignee: The Dow Chemical Company, Midland, Mich.

[21] Appl. No.: 846,408

[22] Filed: Mar. 31, 1986

Related U.S. Application Data

[63] Continuation-in-part of Ser. No. 722,877, Apr. 12, 1985, abandoned.

[51] Int. Cl.$^4$ ............................. C08J 9/12; C08J 9/14
[52] U.S. Cl. ........................................ 521/79; 264/50; 264/53; 264/DIG. 5; 521/97; 521/98; 521/146; 521/910
[58] Field of Search ..................... 264/50, 53, DIG. 5; 521/79, 97, 98, 146, 910

[56] References Cited

U.S. PATENT DOCUMENTS

| | | | |
|---|---|---|---|
| 2,669,751 | 2/1954 | McCurdy et al. | 264/53 |
| 3,014,702 | 12/1961 | Oldershaw et al. | 264/53 |
| 3,583,678 | 6/1971 | Harder | 264/53 |
| 3,751,377 | 8/1973 | Buckner | 264/53 |
| 3,817,669 | 6/1974 | Buckner | 425/4 C |
| 3,960,792 | 6/1976 | Nakamura | 521/79 |
| 4,393,016 | 7/1983 | Akiyama et al. | 264/53 |
| 4,424,287 | 1/1984 | Johnson et al. | 264/50 |
| 4,451,417 | 5/1984 | Akiyama et al. | 264/53 |
| 4,464,484 | 8/1984 | Yoshimura et al. | 521/58 |

Primary Examiner—Morton Foelak
Attorney, Agent, or Firm—R. B. Ingraham; M. L. Winkelman

[57] ABSTRACT

Styrene polymer foam is prepared using a mixed blowing agent of carbon dioxide plus ethyl chloride and optionally a fluorocarbon to provide a foam having primary cells and secondary cells formed in the struts and walls.

7 Claims, No Drawings

METHOD FOR THE PREPARATION OF STYRENE POLYMER FOAM AND FOAM PREPARED THEREBY

This application is a continuation-in-part of copending application Ser. No. 722,877 filed Apr. 12, 1985, now abandoned.

One of the larger applications for styrene polymer foams is in the field of thermal insulation. The styrene polymer foam suitable for thermal insulation desirably has relatively small cells and dimensional stability. It is also desirable that the insulating value of the foam be maintained for as long a period as possible. The variety of styrene polymer foams contemplated within the scope of this invention are the so-called extruded foams. Such extruded foams have a fairly uniform cell size when compared to the so-called molded bead foams. Extruded foams are also employed in the so-called decorative field wherein a foam plank may be cut into a decorative foam and be used as is or used as a base for further decorative material. Particularly desirable stable styrene polymer foam is obtained employing the method set forth in U.S. Pat. No. 3,960,792 to M. Nakamura. For a considerable period of time, styrene polymer foams have been extruded employing methyl chloride alone as the blowing agent or a mixture of methyl chloride with chlorofluorocarbons. When employing such a system in extrusion, generally it must be aged for a period of time to permit the methyl chloride to leave the cells and air to enter by an appropriate diffusion process through the cell walls. Also, in foams employing methyl chloride as the total blowing agent or as a partial blowing agent, the period of aging for thicker extruded boards and planks can present an inconvenient warehousing problem. Also, due to the undesirable physical characteristics of methyl chloride, caution and good ventilation are utilized when such foams are stored or cut to shape.

Extruded foams and their manufacture are discussed at great length in U.S. Pat. Nos. 2,409,910; 2,515,250; 2,669,751; 2,848,428; 2,928,130; 3,121,130; 3,121,911; 3,770,688; 3,815,674; 3,960,792; 3,966,381; 4,085,073; 4,146,563; 4,229,396; 4,312,910; 4,421,866; 4,438,224; 4,454,086 and 4,486,550.

Styrene polymer foam has been prepared using as the blowing agent a mixture of ethyl chloride, methyl chloride and dichlorodifluoromethane or a mixture of ethyl chloride and dichlorodifluoromethane. Such foam preparation is set forth in U.S. Pat. Nos. 4,393,016 and 4,451,417, respectively. An alternative blowing agent system utilizing carbon dioxide and an alkane is set forth in U.S. Pat. Nos. 4,344,710 and 4,424,287; the teachings of which are herewith incorporated by reference thereto.

It would be desirable if there were available an improved process for the preparation of alkenyl aromatic polymer foam.

It would also be desirable if there were available an improved process for the preparation of an alkenyl aromatic polymer foam which did not employ methyl chloride as the blowing agent.

It would also be desirable to replace methyl chloride with a more environmentally acceptable material.

These benefits and other advantages in accordance with the present invention are achieved in a process for the preparation of an alkenyl aromatic thermoplastic resinous elongate foam body having a machine direction and a transverse direction, the body defining a plurality of closed noninterconnecting gas-containing cells therein, the steps of the method comprising heat plastifying an alkenyl aromatic synthetic resinous material, adding to the heat plastifying synthetic resinous material a volatile fluid foaming agent to provide a foaming agent resinous polymer mixture under a pressure sufficiently high that foaming is prevented, mixing the fluid foaming agent with the plastified resin to form a blowable resinous mixture, reducing the temperature of the mixture to a temperature such that when pressure is removed therefrom, a foam of desirable quality is obtained, reducing the pressure on the mixture to thereby cause the mixture to form a foam of desired quality, the improvement which comprises employing a blowing agent mixture of from about 3–45 weight percent of carbon dioxide, from 5–97 weight percent ethyl chloride and from about 0–90 weight percent of a member selected from the group consisting of dichlorodifluoromethane, 1-chloro-1,1-difluoroethane and mixtures thereof, the blowing agent mixture being utilized at a level of about 3–18 parts by weight per 100 parts by weight of resinous material.

Also contemplated within the scope of the present invention is a synthetic resinous thermoplastic foam prepared in accordance with the hereinbefore described method wherein an alkenyl aromatic thermoplastic synthetic resinous elongate foam body having a machine direction and a transverse direction, the body defining a plurality of closed noninterconnecting gas-containing cells therein, with the further limitation that the cells contain at least residual vaporized blowing agent hereinbefore described.

By the term "alkenyl aromatic synthetic resin" is meant a solid polymer of one or more polymerizable alkenyl aromatic compounds. The polymer or copolymer comprises in chemically combined form, at least 75 percent by weight of at least one alkenyl aromatic compound having the general formula

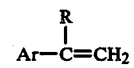

wherein Ar represents an aromatic hydrocarbon radical, or an aromatic halo-hydrocarbon radical of the benzene series, and R is hydrogen or the methyl radical. Examples of such alkenyl aromatic resins are the solid homopolymer of styrene, a-methylstyrene, o-methylstyrene, m-methylstyrene, p-methylstyrene, ar-ethylstyrene, ar-vinylxylene, ar-chlorostyrene or ar-bromostyrene; the solid copolymers of two or more of such alkenyl aromatic compounds with minor amounts of other readily polymerizable olefinic compounds such as methylmethacrylate, acrylonitrile, maleic anhydride, citraconic anhydride, itaconic anhydride, acrylic acid, rubber reinforced (either natural or synthetic) styrene polymers, etc.

Blowing agents useful in the practice of the present invention of commercial purity are generally satisfactory. In the practice of the present invention, carbon dioxide is generally employed in the proportions of from about 3–45 weight percent of total blowing agent whereas ethyl chloride is employed at a level of about 5–97 weight percent, preferably at a level of about 19–97 weight percent, and the dichlorodifluoromethane or 1,1,1-chlorodifluoroethane is employed from 0–90 weight percent of the total weight of the total blowing agent component. In the preparation of foams particularly suitable for thermal insulation, carbon dioxide is employed at a level of from about 3-25 weight percent of the total blowing agent whereas ethyl chloride is employed at a level of about 5-60 weight percent, preferably at a level of about 19-60 weight percent, and the chlorofluorocarbons are employed at a level of about 30-90 weight percent. The dichlorodifluoromethane or chlorodifluoroethane, or a mixture of each, may be utilized. In the event that it is desired to prepare foam particularly suitable for decorative applications, that is, a large cell foam that is readily cut and machined to desired configurations, carbon dioxide is employed at a level of from about 3-45 weight percent, ethyl chloride at a level of from about 60-97 weight percent and the chlorofluorocarbon component 0-25 weight percent. The blowing agent mixture may be supplied to the alkenyl aromatic resin in any conventional manner. For example, a mixture of the desired composition of blowing agent may be directly injected into a heat plastifying and mixing apparatus such as an extruder, and the components of the mixture may be separately injected into the heat plastified resin.

Alternatively alkenyl aromatic resinous particles may be treated in a pressure vessel and the blowing agent mixture impregnated into the particles at ambient or elevated temperature.

Generally, the preparation of alkenyl aromatic resinous polymer foams in accordance with the present invention is most conveniently done in a manner generally shown and described in U.S. Pat. No. 2,669,751, wherein the volatile fluid foaming agent is injected into a heat-plastified polymer stream within an extruder. From the extruder the heat-plastified gel is passed into a mixer, the mixer being a rotary mixer wherein a studded rotor is enclosed within a housing which has a studded internal surface which intermeshes with the studs on the rotor. The heat-plastified gel from the extruder is fed into the inlet end of the mixer and discharged from the outlet end, the flow being in a generally axial direction. From the mixer, the gel passes through coolers such as are described in U.S Pat. No. 2,669,751 and from the coolers to a die which extrudes a generally rectangular board. A generally similar extrusion system and a preferred extrusion system is shown in U.S. Pat. No. 3,966,381.

In the preparation of foams in accordance with the present invention, it is often desirable to add a nucleating agent to reduce the primary cell size. Talc, calcium silicate, indigo, and the like are suitable agents which reduce primary cell size.

Various other additives may be utilized, such as fire retardant chemicals, stabilizers and the like.

In the preparation of foams in accordance with the present invention, the blowing agent may be added to the resin in any convenient manner. Generally the blowing agent mixture is pumped into heat plastified alkenyl aromatic resin and admixed therewith prior to extrusion to form foam. The blowing agent may be admixed and pumped as a combination stream into the heat plastified resin, or they may be supplied as separate streams. Adequate mixing of the blowing agents into the heat plastified resin is required in order to obtain a product of desirable uniformity. Such mixing may be accomplished by a variety of means including rotary mixers such as extruders, so-called static mixers or interfacial surface generators, such as are utilized in U.S. Pat. Nos. 3,751,377 and 3,817,669.

The following abbreviations are employed in the examples that follow:

| | | | |
|---|---|---|---|
| pcf | pounds per cubic foot | EtCl | Ethyl Chloride |
| mm | millimeters | FC-12 | Dichlorodifluoromethane |
| Vert | Vertical or thickness, compression strength | FC-142b | 1,1,1-Chlorodifluoroethane |
| Horiz | Horizontal or width, compression strength | °C. | Centigrade |
| Ext | Extrusion or longitudinal direction | °F. | Fahrenheit |
| psi | pounds per square inch | RH | Relative Humidity |
| in | inch | lbs | pounds |
| $in^2$ | square inch | $ft^2$ | square feet |
| pph | parts per hundred | hr | hour |
| (c) | comparative | BTU | British Thermal Units |
| $CO_2$ | Carbon Dioxide | | |

EXAMPLE 1

A styrene polymer foam was prepared utilizing a 2½ inch diameter extruder which fed a rotary mixer generally of the configuration disclosed in U.S. Pat. No. 2,669,751. The rotary mixer discharge was passed through three heat exchangers of the variety shown in U.S. Pat. No. 3,014,702. The discharge from the heat exchangers was in turn passed through a plurality of interfacial surface generators or static mixers of the type shown in U.S. Pat. No. 3,583,678. The discharge from the static mixers was passed to a slot die.

Foam was discharged from the slot die at a rate of 200 pounds per hour. Three experimental foams were prepared; one in accordance with the present invention. The results are set forth in Table I.

TABLE I

EFFECT OF BLOWING AGENT TYPE ON SKIN QUALITY AND COMPRESSIVE STRENGTH

| Blowing Agent | Pressure (psi) | Density (pcf) | Surface* Quality | Fresh Compressive Strength (psi) | | |
|---|---|---|---|---|---|---|
| | | | | Vert | Horiz | Ext |
| 6.8 pph $CO_2$(c) | 1800 | 4.03 | 5 | 158.5 | 97.6 | 69.8 |
| 4.0 pph $CO_2$ (40%) 6.0 pph EtCl (60%) | 1000 | 2.14 | 1 | 44.2 | 26.5 | 23.5 |
| 11.3 pph EtCl(c) | 320 | 2.29 | 1 | 12.6 | 23.3 | 14.2 |

*The skin quality is a measure of surface smoothness. The sample is visually assigned a value between 1 and 5 according to surface smoothness, one being the smoothest.

The foregoing table shows that the addition of $CO_2$ to EtCl reduces the density at about equivalent number of moles of blowing agent and increases the compressive strength considerably even at lower foam density.

The resultant foam obtained with the mixture of carbon dioxide and ethyl chloride was a large cell foam suitable for decorative processes.

EXAMPLE 2

The general procedure of Example 1 was repeated with the exception that a foam suitable for insulation was obtained. Extrusions were made for comparative purposes and one in accordance with the invention. The results are set forth in Table II.

TABLE II
EFFECT OF BLOWING AGENT TYPE ON SURFACE QUALITY*

| Blowing Agent | Die Pressure (psi) | Cell Size (mm) | Density (pcf) | Cross-section (in$^2$) | Surface** Quality | Fresh k-factor | 5 yr*** k-factor |
|---|---|---|---|---|---|---|---|
| 6.8 pph CO$_2$$^{(c)}$ | 1800 | 0.12 | 4.03 | 6.33 | 5 | 0.212 | 0.279 |
| 5.5 pph CO$_2$/ 5.5 pph FC-12$^{(c)}$ | 1275 | 0.10 | 4.24 | 6.34 | 4 | 0.191 | 0.224 |
| 3.9 pph CO$_2$/(30%) 4.6 pph FC-142b/(35%) 4.6 pph EtCl (35%) | 975 | 0.43 | 2.15 | 8.75 | 1 | 0.208 | 0.212 |

*Typical additive levels include 1.5 pph FR-651P (monochloropentabromo cyclodexane), 0.15 pph barium stearate, and 0.03 pph magnesium oxide. Typically the foaming temperature varies between 106° C. and 125° C.
**The sample is visually assigned a value between 1 and 5 according to surface smoothness one being the best and 5 the worst.
***Fresh k-factor (thermal conductivity) is measured at a mean temperature of 75° F. using a direct reading heat film meter apparatus according to ASTM C518. The 5 year k-factor is a calculated value from a computerized mathematical model. The units on k-factor are BTU-in/hr. °F. ft$^2$.

Table II shows that much larger cell size can be obtained by using carbon dioxide and 1,1,1-chlorodifluoroethane as mixed blowing agent and that the larger the cell size, the lower the density and the larger the cross-section. The smoothness of the foam skin is important for many insulation applications. When carbon dioxide is used in combination with several other blowing agents, the die pressure is reduced. Adding dichlorodifluoromethane improved the skin quality slightly and addition of ethyl chloride to carbon dioxide and dichlorodifluoromethane as mixed blowing agent improved the skin quality considerably as shown in Table II.

EXAMPLE 3

The general procedure of Example 1 was repeated to form a variety of compositions. The results are set forth in Table III.

Table III shows that addition of carbon dioxide to ethyl chloride and dichlorodifluoromethane mixed blowing agent improved the dimensional stability at elevated temperatures which was quite an unexpected result because of its fast permeation rate through polystyrene.

EXAMPLE 4

The general procedure of Example 1 was repeated with styrene/acrylic acid copolymers (SAA), polystyrene (PS) and PS/SAA blends with the exception that a foam suitable for insulation was obtained.

Foam was discharged from the slot die at a rate of about 250 pounds per hour. The PS had a Mw (weight-average molecular weight) of about 200,000 and the SAA was three (3) percent by total weight acrylic acid with a Mw of about 160,000, unless otherwise noted.

The results are set forth in Table IV.

TABLE III
EFFECT OF BLOWING AGENT TYPE ON COMPRESSIVE STRENGTH AND DIMENSIONAL STABILITY*

| Thickness (inches) | Blowing Agent | Density (pcf) | Cell Size (mm) | Compressive Strength (psi) Vert | Horiz | Ext | Ambient Aging Time (Days) | Dimensional Change (%)** after 7 days of exposure to 167° F. Vert | Horiz | Ext |
|---|---|---|---|---|---|---|---|---|---|---|
| 1 | 5.3 pph EtCl/ 8.0 pph FC-12$^{(c)}$ | 2.08 | 0.27 | 15.2 | 19.9 | 52.7 | 20 | 4.8 | 2.9 | −0.4 |
| 1½ | 5.3 pph EtCl/ 8.0 pph FC-12$^{(c)}$ | 2.03 | 0.25 | 19.1 | 18.2 | 35.9 | 20 | 3.2 | 2.2 | 1.2 |
| 2 | 5.3 pph EtCl/ 8.0 pph FC-12$^{(c)}$ | 2.22 | 0.22 | 40.2 | 26.5 | 28.0 | 10 | 0.7 | 10.4 | 0.9 |
|  |  |  |  |  |  |  | 30 | −0.2 | 1.6 | 2.9 |
| 2 | 2.0 pph MeCl/ 4.7 pph EtCl/ 6.6 pph FC-12$^{(c)}$ | 2.19 | 0.32 | 19.1 | 23.8 | 34.6 | 20 | 4.3 | 1.0 | 1.3 |
| 1.1 | 1.5 pph CO$_2$/ 3.5 pph EtCl/ 7.5 pph FC-12 | 1.91 | 0.32 | 17.3 | 21.8 | 30.9 | 20 | 0.6 | 1.9 | 0.5 |
| 0.9 | 1.5 pph CO$_2$/ 2.5 pph EtCl/ 7.5 pph FC-12 | 2.21 | 0.26 | 30.7 | 22.0 | 39.2 | 20 | 0.6 | 1.8 | 0.5 |

*Foaming temperature ranges between 115° C. and 126° C.; Die pressure ranges 450 psi and 570 psi; Barium stearate = 0.15–0.2 pph; Magnesium oxide = 0.01–0.04 pph; FR-651P = 1.7–2.0 pph; Talc = 0–0.15 pph; Indigo = 0–0.07 pph.
**The Federal Specification, HHI-524C, allows less than 2% dimensional change in any direction after exposing foam samples for 7 days at 167° F. dry or at 158° F./97% RH.

TABLE IV
EFFECT OF RESIN TYPE ON COMPRESSIVE STRENGTH AND DIMENSIONAL STABILITY OF INSULATION BOARD*

| FC-12 (pph) | EtCl (pph) | CO$_2$ (pph) | Total Blowing Agent (pph) | Resin Type | Density (pcf) | Cell Size (mm) | Aging (days) Prior to Testing | Compressive Strength (psi) Vert | Horiz | Ext | Dimensional Change (%) after 7 days of exposure at 158° F. Vert | Horiz | Ext |
|---|---|---|---|---|---|---|---|---|---|---|---|---|---|
| 7.0 (57%) | 4.0 (32%) | 1.3 (11%) | 12.4 | SAA | 2.23 | 0.35 | 21 | 58.4 | 20.9 | 26.7 | −0.50 | 0.50 | 0.30 |

TABLE IV-continued
EFFECT OF RESIN TYPE ON COMPRESSIVE STRENGTH AND DIMENSIONAL STABILITY OF INSULATION BOARD*

| FC-12 (pph) | EtCl (pph) | CO$_2$ (pph) | Total Blowing Agent (pph) | Resin Type | Density (pcf) | Cell Size (mm) | Aging (days) Prior to Testing | Compressive Strength (psi) Vert | Horiz | Ext | Dimensional Change (%) after 7 days of exposure at 158° F. Vert | Horiz | Ext |
|---|---|---|---|---|---|---|---|---|---|---|---|---|---|
| 8.0 (52%) | 5.5 (36%) | 1.8 (12%) | 15.3 | SAA | 2.49 | 0.30 | 21 | 70.7 | 29.3 | 28.6 | −0.90 | 0.40 | 0.80 |
| 8.0 (71%) | 2.5 (22%) | 0.8 (7%) | 11.3 | SAA | 2.13 | 0.35 | 21 | 47.3 | 25.6 | 26.6 | −0.20 | 0.30 | 0.40 |
| 6.0 (49%) | 5.5 (45%) | 0.8 (6%) | 12.3 | SAA | 2.29 | 0.42 | 21 | 43.7 | 31.2 | 30.3 | −0.70 | 0.40 | 0.40 |
| 6.0 (49%) | 5.5 (45%) | 0.8 (6%) | 12.3 | 1/2** PS/SAA | 2.03 | 0.41 | 21 | 41.5 | 22.2 | 22.4 | −0.50 | 0.20 | 0.50 |
| 7.0 (57%) | 4.0 (32%) | 1.3 (11%) | 12.3 | 2/1** PS/SAA | 2.19 | 0.39 | 21 | 54.3 | 21.7 | 22.4 | −0.60 | 0.40 | 0.60 |
| 7.0 (57%) | 4.0 (32%) | 1.3 (11%) | 12.3 | SAA*** | 2.23 | 0.40 | 21 | 55.1 | 23.1 | 33.8 | −0.50 | 0.90 | 0.30 |
| 7.0 (57%) | 4.0 (32%) | 1.3 (11%) | 12.3 | PS | 2.05 | 0.39 | 21 | 41.7 | 22.9 | 25.7 | −0.10 | 0.70 | 0.70 |
| 8.0 (52%) | 5.5 (36%) | 1.8 (12%) | 15.3 | PS | 2.21 | 0.37 | 21 | 43.5 | 27.7 | 31.2 | −1.00 | 1.9 | 0.60 |
| 8.0 (71%) | 2.5 (22%) | 0.8 (7%) | 11.3 | PS | 2.02 | 0.41 | 21 | 35.4 | 30.2 | 31.2 | 0.40 | 1.0 | 0.80 |
| 6.0 (49%) | 5.5 (45%) | 0.8 (6%) | 12.3 | PS | 2.26 | 0.39 | 21 | 34.8 | 27.5 | 33.0 | −0.40 | 1.4 | 0.60 |
| 8.0 (56%) | 5.5 (38%) | 0.8 (6%) | 14.3 | PS | 1.98 | 0.37 | 21 | 35.5 | 18.0 | 24.6 | −0.07 | 1.7 | 0.50 |
| 6.0 (58%) | 2.5 (24%) | 1.8 (18%) | 10.3 | PS | 2.15 | 0.39 | 21 | 46.4 | 28.6 | 24.1 | −0.20 | 0.10 | 0.60 |
| 8.0 (65%) | 2.5 (20%) | 1.8 (15%) | 12.3 | PS | 1.95 | 0.39 | 21 | 40.3 | 24.3 | 31.5 | 0.03 | 0.90 | 0.20 |
| 6.0 (45%) | 5.5 (41%) | 1.8 (14%) | 13.3 | PS | 2.05 | 0.34 | 21 | 41.6 | 25.0 | 26.1 | −0.7 | 0.90 | 0.30 |

*Foaming temperature between 108° C. and 133° C.; Die pressure ranges between 650 psi and 800 psi; Calcium stearate = 0.05 pph; Magnesium oxide = 0.05 pph; Copper phthalocyanine blue = 0.03 pph; FR-651P = 0.8 pph.
**Weight ratio of PS/SAA
***1 percent by total weight acrylic acid with a $\overline{Mw}$ of about 180,000.

Table IV shows foam having dimensional stability at an elevated temperature and elevated humidity when utilizing a mixed blowing agent of carbon dioxide, ethyl chloride and dichlorodifluoromethane.

EXAMPLE 5

The general procedure of Example 1 was again repeated with a PS having a Mw of about 200,000. Foam was discharged from the slot die at a rate of about 250 pounds per hour.

The results are set forth in Table V.

Table V shows that the use of a CO$_2$/EtCl mixture results in a low density, large cell foam suitable for decorative purposes.

EXAMPLE 6

The general procedure of Example 1 was repeated to obtain a foam suitable for insulation.

The results are set forth in Table VI.

TABLE V
EFFECT OF BLOWING AGENT COMPOSITION ON CRISPNESS OF DECORATIVE BILLETS°

| FC-12 (pph) | EtCl (pph) | CO$_2$ (pph) | Total Blowing Agent (pph) | Polymer Type | Density (pcf) | Cell Size (mm) | Aging (days) Prior to Testing | Compressive Strength (psi) Vert | Horiz | Ext | Crispness Test (lbs)** Top | Center | Bottom |
|---|---|---|---|---|---|---|---|---|---|---|---|---|---|
| 0 | 9.0 (90%) | 1.0 (10%) | 10.0 | PS | 1.97 | 2.36 | 1 | 12.5 | 14.3 | 21.1 | 10.0 | 9.3 | 10.1 |
| 0 | 9.0 (86%) | 1.5 (14%) | 10.5 | PS | 1.82 | 1.44 | 1 | 20.4 | 14.1 | 13.5 | 10.1 | 9.8 | 10.0 |
| 0 | 8.0 (89%) | 1.0 (11%) | 9.0 | PS | 2.15 | 1.86 | 1 | 17.8 | 18.2 | 17.9 | 10.6 | 10.4 | 11.0 |
| 1.0 (10%) | 8.0 (80%) | 1.0 (10%) | 10.0 | PS | 1.81 | 1.80 | 1 | 17.4 | 18.3 | 17.8 | 10.8 | 10.6 | 10.8 |

°Foaming temperature between 108° C. and 117° C.; Die pressure ranges between 270 psi and 450 psi; Calcium sterate = 0.05 pph; Magnesium oxide = 0.05 pph; FR-651P ranges between 0.64 pph and 1.37 pph.
**Crispness Test - The laboratory crispness test involves a free steel ring and an Instron tensile testing machine. The small ring is forced into a sample of decorative billet at a rate of 5 in/min for a total of 0.3 in. The force penetration is recorded on a strip chart run at 20–30 in/min. The force is read from the chart at a penetration of 0.1 in. The steel ring has an 0.75" outside diameter and an 0.670" inside diameter. The axial length is not critical but should be at least 0.5". The acceptable machinability is obtained if the crispness is between 8.0–11.0.

TABLE VI

EFFECT OF BLOWING AGENT ON DIMENSIONAL STABILITY*

| FC-12 (pph) | EtCl (pph) | CO$_2$ (pph) | Total Blowing Agent (pph) | Density (pcf) | Cell Size (mm) | Aging Prior to Testing (Days) | Dimensional Change (%) at 158° F./Ambient RH** | | |
|---|---|---|---|---|---|---|---|---|---|
| | | | | | | | Vert | Horiz | Ext |
| 8.9 (74%) | 2.4 (20%) | 0.7 (6%) | 12.0 | 2.29 | 0.29 | 1 | 0.2 | 0.3 | 0.7 |
| 10.4 (87%) | 1.2 (10%) | 0.4 (3%) | 12.0 | 2.64 | 0.25 | 1 | −0.2 | −0.3 | 0.5 |
| 11.3 (87%) | 1.3 (10%) | 0.4 (3%) | 13.0 | 2.56 | 0.22 | 1 | 0.00 | −0.1 | 0.7 |
| 13.0 (87%) | 1.5 (10%) | 0.5 (3%) | 15.0 | 2.43 | 0.15 | 1 | −0.9 | 0.2 | 0.3 |

*Foaming Temperature ranges from about 115° C. to about 128° C.; Die pressure ranges from about 600 psi to about 900 psi; Barium stearate = 0.15 pph; Copper phthalocyanine blue = 0.03 pph; Tetrasodiumpyrophosphate = 0.06 pph; Hexabromocyclododecane = 1.6 pph.
**TEST CONDITIONS: 48 hours followed by 24 hours at ambient conditions before remeasuring dimensions.

Table VI shows a small cell, low density insulating foam having dimensional stability obtained when utilizing a mixed blowing agent of carbon dioxide, ethyl chloride and dichlorodifluoromethane.

In a manner similar to the foregoing procedures, other highly desirable alkenyl aromatic thermoplastic resinous foam bodies are prepared.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A process for the preparation of an alkenyl aromatic thermoplastic resinous elongate foam body having a machine direction and a transverse direction, the body defining a plurality of closed noninterconnecting gas-containing primary cells therein, the steps of the method comprising heat plastifying an alkenyl aromatic synthetic resinous material, adding to the heat plastifying synthetic resinous material a volatile fluid foaming agent to provide a foaming agent resinous polymer mixture under a pressure sufficiently high that foaming is prevented, mixing the fluid foaming agent with the plastified resin to form a blowable resinous mixture, reducing the temperature of the mixture to a temperature such that when pressure is removed therefrom, a foam of desirable quality is obtained, reducing the pressure on the mixture to thereby cause the mixture to form a foam of desired quality, the improvement which comprises employing a blowing agent mixture of from about 3-45 weight percent of carbon dioxide, from 5-97 weight percent ethyl chloride and from about 0-90 weight percent of a fluorocarbon member selected from the group consisting of dichlorodifluoromethane, 1-chloro-1,1-difluoroethane and mixtures thereof, the blowing agent mixture being utilized at a level of about 3-18 parts per 100 parts of resinous material.

2. The process of claim 1 employing in the blowing agent mixture from about 3-25 weight percent of carbon dioxide.

3. The process of claim 1 wherein the blowing agent mixture comprises from about 5-60 weight percent of ethyl chloride.

4. The process of claim 1 employing in the blowing agent mixture from about 30-90 weight percent of fluorocarbon member.

5. The process of claim 1 employing in the blowing agent mixture from about 0-25 weight percent of fluorocarbon member.

6. The process of claim 1 wherein the blowing agent mixture comprises from about 3-25 weight percent carbon dioxide, from about 5-60 weight percent ethyl chloride and from about 30-90 weight percent of fluorocarbon member.

7. The process of claim 1 employing as a blowing agent mixture from about 3-45weight percent carbon dioxide, from about 60-90 weight percent ethyl chloride and from about 0-25 weight percent fluorocarbon member.

* * * * *